(12) United States Patent
O'Brien

(10) Patent No.: US 9,546,046 B2
(45) Date of Patent: Jan. 17, 2017

(54) APPARATUS FOR CONVEYOR BELT TRACKING

(71) Applicant: James O'Brien, Mariposa, CA (US)

(72) Inventor: James O'Brien, Mariposa, CA (US)

(*) Notice: Subject to any disclaimer, the term of this patent is extended or adjusted under 35 U.S.C. 154(b) by 0 days.

(21) Appl. No.: 14/712,076

(22) Filed: May 14, 2015

(65) Prior Publication Data

US 2016/0332819 A1 Nov. 17, 2016

(51) Int. Cl.
*B65G 39/10* (2006.01)
*B65G 15/64* (2006.01)
*B65G 15/08* (2006.01)

(52) U.S. Cl.
CPC ............. *B65G 15/64* (2013.01); *B65G 15/08* (2013.01)

(58) Field of Classification Search
CPC .......... B65G 39/16; B65G 15/08; B65G 15/64
USPC .... 198/806, 808, 810.03, 840; 474/106, 108
See application file for complete search history.

(56) References Cited

U.S. PATENT DOCUMENTS

| | | | | |
|---|---|---|---|---|
| 1,360,717 A * | 11/1920 | Bossert | ................. | B65G 39/16 226/23 |
| 2,797,794 A * | 7/1957 | Bradley | ................. | B65G 39/16 198/806 |
| 3,545,599 A * | 12/1970 | Barber | ................. | B65G 39/16 198/807 |
| 3,553,058 A * | 1/1971 | Good | ................. | B26D 7/015 156/467 |
| 3,687,273 A * | 8/1972 | Macone | ................. | B65G 39/16 198/806 |
| 3,692,674 A * | 9/1972 | Wood | ................. | B65G 39/16 210/401 |
| 3,710,927 A * | 1/1973 | Alsted | ................. | B65G 39/16 198/807 |
| 3,927,814 A * | 12/1975 | Holm | ................. | B65G 39/16 198/837 |
| 4,339,031 A | 7/1982 | Densmore | | |
| 4,830,179 A | 5/1989 | Fyfe | | |
| 4,852,724 A | 8/1989 | Bodimer | | |
| 4,917,232 A * | 4/1990 | Densmore | ............. | B65G 39/16 198/808 |
| 5,826,703 A | 10/1998 | Altemus, Jr. et al. | | |
| 6,712,193 B2 | 3/2004 | Dingeldein et al. | | |
| 6,852,050 B2 * | 2/2005 | Sands | ................. | B65G 39/16 198/810.03 |
| 7,669,709 B2 * | 3/2010 | Hovsto | ................. | B65G 39/16 198/806 |
| 8,337,280 B2 | 12/2012 | Duescher | | |
| 9,027,744 B1 * | 5/2015 | Balcar | ................. | B65G 15/64 198/806 |
| 2008/0041910 A1 | 2/2008 | Enyedy | | |

* cited by examiner

*Primary Examiner* — William R Harp
(74) *Attorney, Agent, or Firm* — Felix L. Fischer

(57) ABSTRACT

A conveyor belt tracking system incorporates a receiving arm secured within a conveyor belt operating system with a roller assembly. The roller assembly has an upper plate and a lower plate forming a high aspect ratio groove to receive a conveyor belt. An axle extending from the receiving arm supports the upper plate and lower plate for rotational motion.

18 Claims, 4 Drawing Sheets

APPARATUS FOR CONVEYOR BELT TRACKING

BACKGROUND INFORMATION

Field

Embodiments of the disclosure relate generally to conveyor belt drive and support systems and more particularly to embodiments for an idler roller set having rollers receiving a conveyor belt in a deep groove with a slight V-shape for preventing belt travel out of the roller and a hard sleeve pressed onto the roller hub for abrasion resistance.

Background

Conveyor belt systems require idlers to guide the conveyor belt on a desired track and prevent displacement of the belt. Prior art devices typically employ idler rollers that are a straight roller or, in alternative embodiments a slight hourglass profile. However, as the belt comes in contact with conventional idler rollers the belt may travel up over the roller or down under the roller into the shaft. Displacement up and over does not maintain the belt on the desired track, and displacement down and under the roller may damage the belt or the structure of the idler roller support by cutting into the shaft supporting the idler roller. In attempts to avoid departure of the belt from the idler roller, continuous and/or significant pressure may be exerted by the roller for belt control. This may contribute to premature belt wear or failure.

It is therefore desirable to provide an idler roller configuration which prevents departure of the conveyor belt from the roller and provides minimal wear on the belt.

SUMMARY

Exemplary embodiments provide a conveyor belt tracking system which incorporates a receiving arm secured within a conveyor belt operating system with a roller assembly. The roller assembly has an upper plate and a lower plate forming a high aspect ratio groove to receive a conveyor belt. An axle extending from the receiving arm supports the upper plate and lower plate for rotational motion.

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
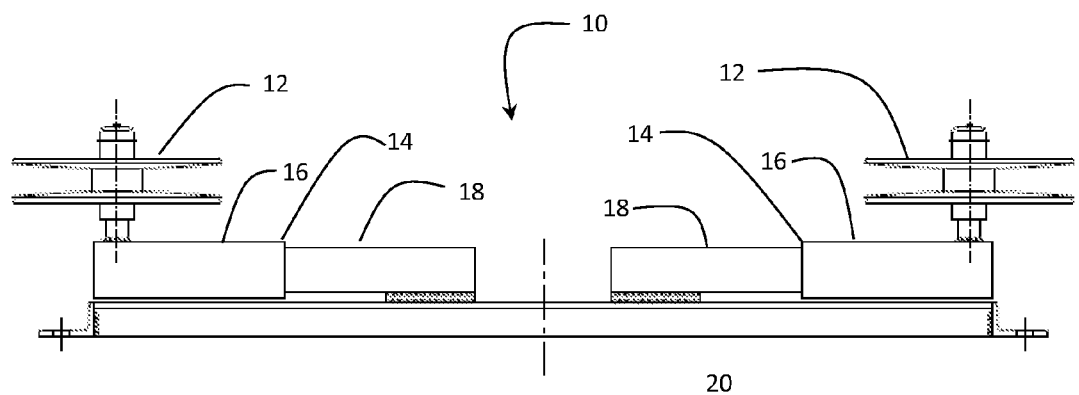
FIG. 1 is a front view of an embodiment of the conveyor belt tracking system in a return configuration.
Figure 2:
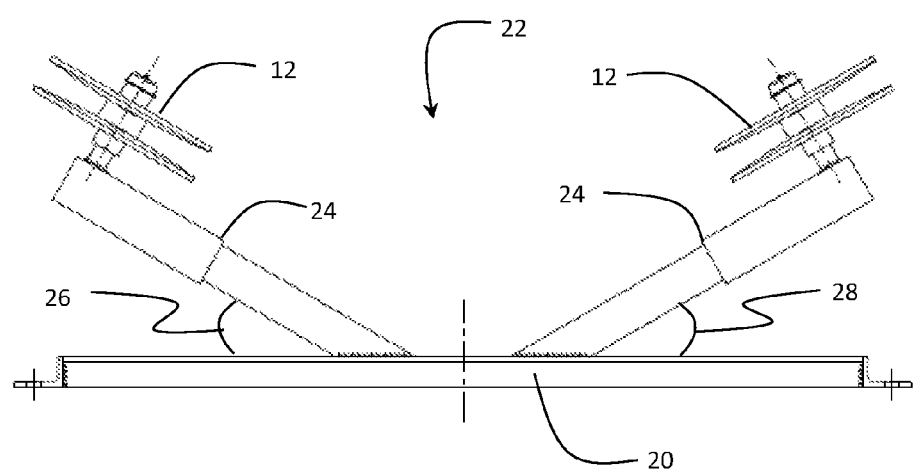
FIG. 2 is a front view of an embodiment of the conveyor belt tracking system in a troughing configuration.

The embodiments described herein disclose a conveyor belt tracking system having an idler roller set with rollers receiving a conveyor belt in a deep groove with a slight V-shape for preventing belt travel out of the roller and a hard sleeve pressed onto the roller hub for abrasion resistance. As seen in FIG. 1, the conveyor belt tracking system 10 provides support for two opposing idler roller assemblies 12. The idler roller assemblies 12 are mounted on receiving arms 14 which may include an outer element 16 telescopically received on an inner element 18 to allow width adjustment between the roller assemblies. The receiving arms 14 are mounted on a deck frame 20 secured within the conveyor belt operating system. The return configuration of the idler rollers assemblies 12 shown in FIG. 1 provides for support of a flat horizontal conveyor belt as will be described in greater detail subsequently. FIG. 2 demonstrates an alternative configuration for the conveyor belt tracking system 22 in which the receiving arms 24 are mounted at opposing angles 26, 28 from the deck frame 20 to support the idler roller assemblies 12 at an angle to receive the belt in a troughing configuration, as will be described in greater detail subsequently. The receiving arms and deck frame mounting structures disclosed may be altered as required for specific geometries or other considerations.

Figure 3A:
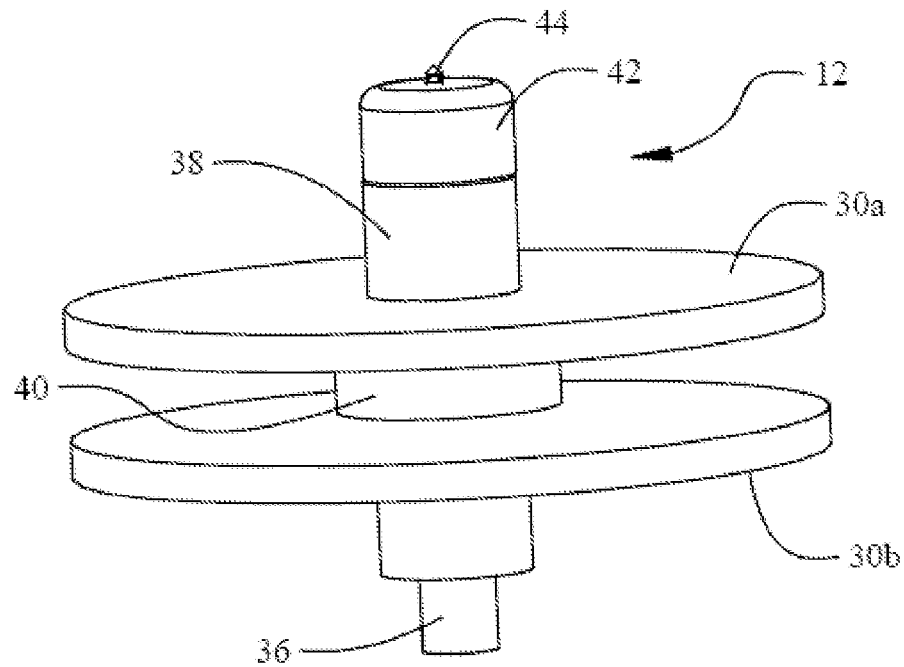
FIG. 3A is a perspective view of an idler roller for the embodiments in FIGS. 1 and 2.
Figure 3B:
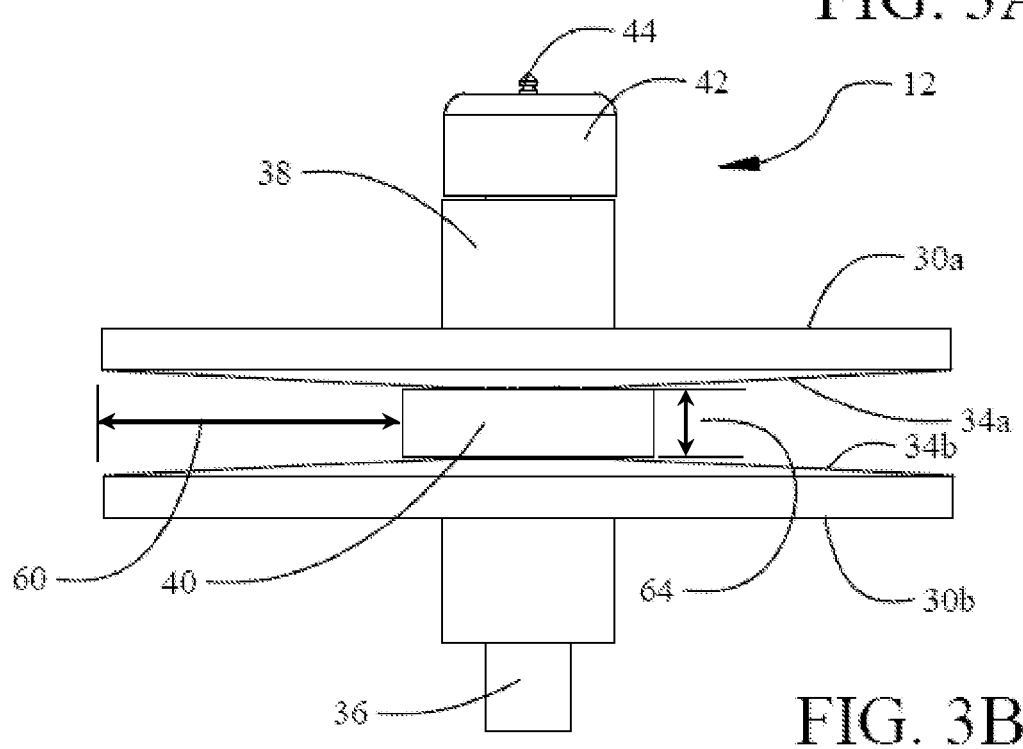
FIG. 3B is a side view of the idler roller of FIG. 3A.

The idler roller assemblies 12 are shown in detail in FIGS. 3A and 3B. Each idler roller assembly 12 includes an upper plate 30a and lower plate 30b which form a groove 32 to receive the belt. Groove 32 has a high aspect ratio (i.e. depth/width) to secure the belt as will be described in greater detail subsequently. As best seen in FIG. 3B, the inner surfaces 34a and 34b of the plates are tapered to provide a V-shape to the groove to further enhance tracking capability in receiving the belt (the V-shape profile is exaggerated in the drawings for clarity). The upper and lower plates 30a and 30b are supported for rotational motion on an axle 36 extending from the receiving arm 14 with a hub 38. The upper and lower plates are received over and constrained on the common hub. A hard metal sleeve 40 is pressed onto the hub 38 between the upper and lower plates to separate the plates and provide a tough surface for engagement of the edges of the belt to prevent wear of the axle hub. The plates 30a and 30b are secured to the hub 38, in the exemplary embodiment by a 360 degree weld joining each plate to the hub. For an exemplary embodiment, the sleeve 40 may be fabricated from material such as mild steel and treated with hard facing or overlays comprised of high chromium and tungsten carbide type alloys having a hardness ranging from 600-2570 BHN.

A retainer cap 42 or similar element may be employed to constrain the hub 38 of the idler roller assembly 12 on the axle 36. The retainer cap 42 may incorporate a grease fitting 44 such as a Zerk grease nipple or similar device to lubricate the assembly.

Figure 4:
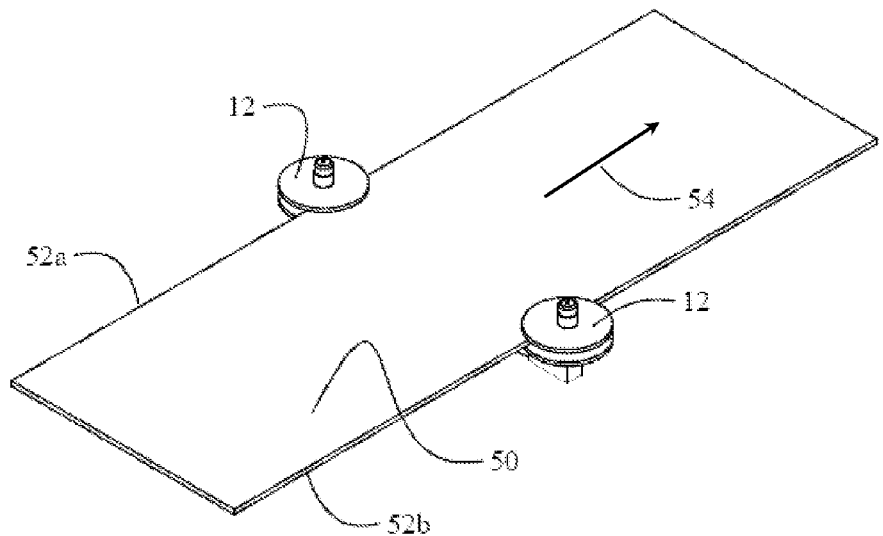
FIG. 4 is a perspective view of the conveyor belt tracking system in a return configuration with the belt.
Figure 5:
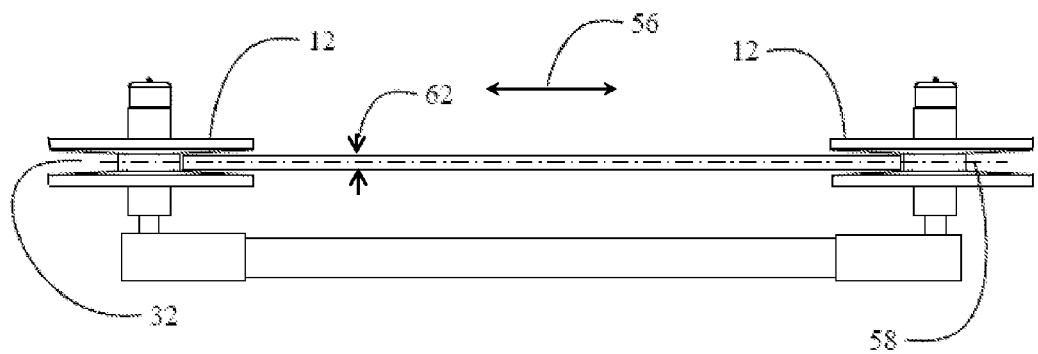
FIG. 5 is a front view of the conveyor belt tracking system in the return configuration with the belt.

The mounted idler roller assemblies 12 receive a conveyor belt 50 as shown in FIGS. 4-7 for common conveyor structures. As seen in FIGS. 4 and 5 for a return configuration, the belt 50 is substantially horizontal and maintained in a substantially planar condition. Opposing edges 52a and 52b of the belt 50 are received in the grooves 32 of the idler roller assemblies 12. Translation of the belt, represented by arrow 54 in FIG. 4, is accommodated by rotation of the idler roller assemblies 12 on the axles 36. Transverse motion of the belt, represented by arrow 56 in FIG. 5, is accommodated by the V-shaped inner surfaces 34a and 34b of the upper and lower plates 30a and 30b which urges the belt into a consistent substantially planar centerline 58. Contact by the belt edges 52a and 52b is reacted by the hard sleeves 40. For exemplary embodiments to achieve the high aspect ratio of the groove providing desired belt control, the depth 60 of the groove 32 (best seen in FIG. 3B) is 2 to 7 times the belt thickness 62. The width 64 of the groove 32 at its smallest point next to the sleeve must be at least as wide as the belt thickness 62 to 3 times the belt thickness. The difference between the groove width at its smallest point next to the sleeve to its outer most widest point which provides the V-shape is ⅛" to ¾" in an exemplary embodiment providing 2° to 15° of angle.

Figure 6:
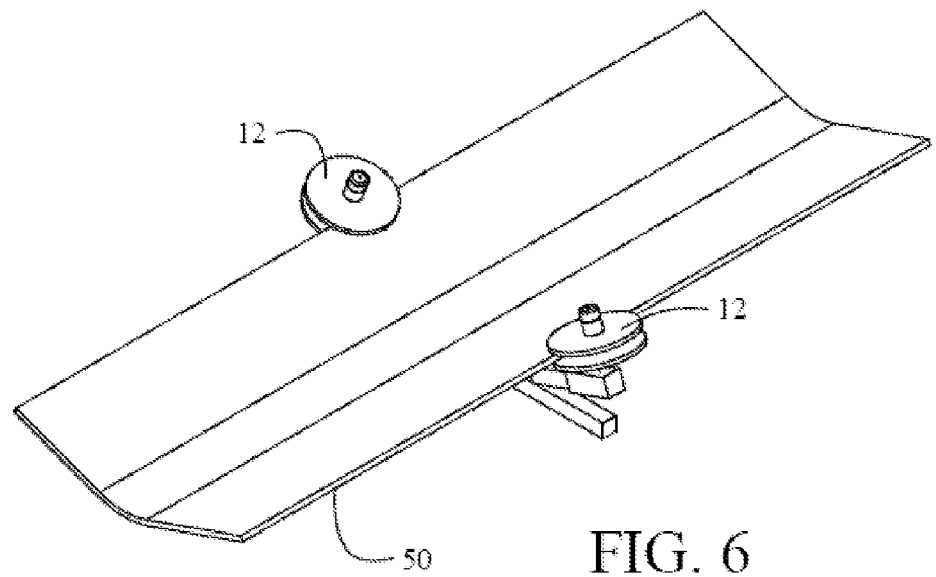
FIG. 6 is a perspective view of the conveyor belt tracking system in a troughing configuration with the belt; and, FIG. 7 is a front view of the conveyor belt tracking system in the troughing configuration with the belt.
Figure 7:
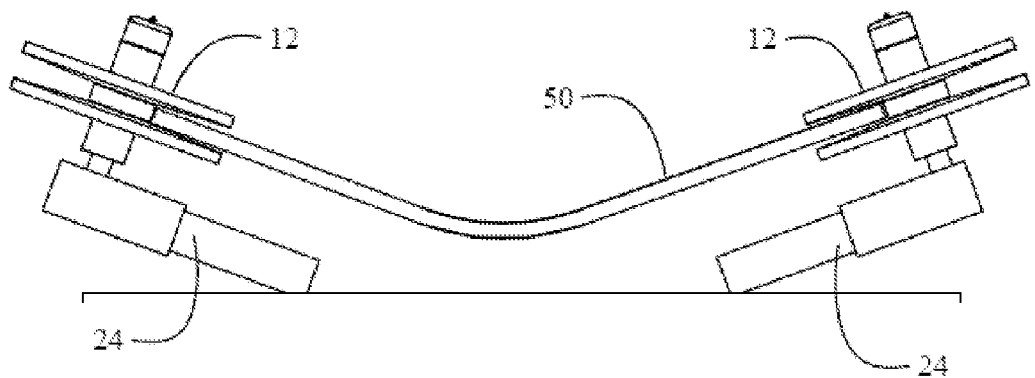

The operation and properties of the idler roller assemblies 12 in the troughing configuration as shown in FIGS. 6 and 7 is similar with the exception that the belt 50 is maintained in the troughed shape by the angled idler roller assemblies. The high aspect ratio and the V-shape of the groove 32 enhance the capability for control of the belt 50 by the idler roller assemblies 12 in the troughing configuration.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A conveyor belt tracking system comprising:
   at least one receiving arm secured within a conveyor belt operating system;
   a roller assembly having
      an upper plate and a lower plate forming a high aspect ratio groove with an aspect ratio between 2 and 7 to receive a conveyor belt; and,
      an axle extending from the at least one receiving arm and supporting the upper plate and lower plate for rotational motion.

2. The conveyor belt tracking system as defined in claim 1 wherein the upper plate and lower plate have V-shaped inner surfaces.

3. The conveyor belt tracking system as defined in claim 2 wherein the V-shaped inner surfaces have an angle between 2° and 15°.

4. The conveyor belt tracking system as defined in claim 1 further comprising a hub received on the axle on which the upper plate and the lower plate are constrained.

5. The conveyor belt tracking system as defined in claim 4 further comprising a hardened sleeve received on the hub intermediate the upper plate and lower plate.

6. The conveyor belt tracking system as defined in claim 5 further comprising a retainer cap constraining the hub, upper plate, sleeve and lower plate on the axle.

7. The conveyor belt tracking system as defined in claim 5 wherein the sleeve is mild steel and treated with hard facing or overlays having a hardness ranging from 600-2570 BHN.

8. The conveyor belt tracking system as defined in claim 7 wherein the hard facing or overlays are selected from the set of high chromium or tungsten carbide alloys.

9. The conveyor belt tracking system as defined in claim 1 wherein the at least one receiving arm comprises a first receiving arm and a second receiving arm, said first receiving arm having a first roller assembly mounted thereon and said second receiving arm having a second roller assembly mounted thereon in opposition to the first roller assembly thereby maintaining a conveyor belt between the first roller assembly and the second roller assembly.

10. The conveyor belt tracking system as defined in claim 9 wherein the first receiving arm and second receiving arm are mounted to a deck frame in a return configuration to support the conveyor belt in a substantially flat configuration.

11. The conveyor belt tracking system as defined in claim 9 wherein the first receiving arm and second receiving arm are mounted to a deck frame at opposing angles to support the conveyor belt in a troughing configuration.

12. The conveyor belt tracking system as defined in claim 9 wherein the first receiving arm and second receiving arm each incorporate an outer element telescopically received on an inner element to allow width adjustment between the first and second roller assemblies.

13. An idler roller assembly for support by a receiving arm in a conveyor belt tracking system, said roller assembly comprising:
    an upper plate and a lower plate forming a high aspect ratio groove having an aspect ratio of between 2 and 7 to receive a conveyor belt;
    an axle supporting the upper plate and lower plate; and,
    a hardened sleeve received intermediate the upper plate and lower plate.

14. The idler roller assembly for support by a receiving arm in a conveyor belt tracking system as defined in claim 13 further comprising:
    a hub, said upper plate and lower plate received on and secured to the hub and said sleeve received on the hub intermediate the upper plate and lower plate.

15. The idler roller assembly for support by a receiving arm in a conveyor belt tracking system as defined in claim 13 wherein the upper plate and lower plate have V-shaped inner surfaces.

16. The idler roller assembly for support by a receiving arm in a conveyor belt tracking system as defined in claim 15 wherein the V-shaped inner surfaces have an angle between 2° and 15°.

17. The idler roller assembly for support by a receiving arm in a conveyor belt tracking system as defined in claim 13 wherein the sleeve is mild steel and treated with hard facing or overlays having a hardness ranging from 600-2570 BHN.

18. The idler roller assembly for support by a receiving arm in a conveyor belt tracking system as defined in claim 17 wherein the hard facing or overlays are selected from the set of high chromium or tungsten carbide alloys.

\* \* \* \* \*